Aug. 25, 1964    C. W. TYDEMAN    3,145,597
HYDRAULICALLY OPERATED TRACER ASSEMBLY FOR ENGINE LATHES
Filed April 6, 1961    4 Sheets-Sheet 1

INVENTOR.
CLARENCE W. TYDEMAN
BY
ATTORNEYS

Aug. 25, 1964  C. W. TYDEMAN  3,145,597
HYDRAULICALLY OPERATED TRACER ASSEMBLY FOR ENGINE LATHES
Filed April 6, 1961  4 Sheets-Sheet 2

FIG. 3.

INVENTOR.
CLARENCE W. TYDEMAN
BY
ATTORNEYS

Aug. 25, 1964 C. W. TYDEMAN 3,145,597
HYDRAULICALLY OPERATED TRACER ASSEMBLY FOR ENGINE LATHES
Filed April 6, 1961 4 Sheets-Sheet 3

INVENTOR.
CLARENCE W. TYDEMAN
BY
ATTORNEYS

United States Patent Office 3,145,597
Patented Aug. 25, 1964

---

3,145,597
HYDRAULICALLY OPERATED TRACER ASSEMBLY FOR ENGINE LATHES
Clarence W. Tydeman, Timnath, Colo., assignor to Tydeman Machine Works, Inc., Redwood City, Calif., a corporation of California
Filed Apr. 6, 1961, Ser. No. 101,297
8 Claims. (Cl. 82—14)

This invention relates to lathe attachments and, more specifically, to a hydraulically-operated tracer assembly for use on engine and turret lathes.

More and more modern machining operations require extreme accuracies of the order of one-thousandth of an inch and less. In fact, some precision systems even demand one ten-thousandth for proper operation. It has been only recently that metal working machines have been engineered to the point where such extreme accuracy became a practical possibility and then only with the finest of equipment in the hands of highly skilled operators. The fact remains, however, that certain techniques are now available by which accuracies of this order may be attained.

Needless to say, however, it is a rare instance indeed when precision of this order can be realized on a multiple unit basis to say nothing of a mass production run. In other words, up to the present time each individual article must be made by the same laborious, time consuming and expensive technique if the desired precision is to be maintained. Even though the machine tools for this work are available commercially, in most instances, the machinists trained in these skills are not. A rather obvious solution to this problem would be to provide a tracer unit capable of being used as an attachment for any high quality engine or turret lathe that would produce machined parts from a precision-made template or workpiece having the desired tolerances. Such a tracer attachment would provide a number of extremely worthwhile advantages. To begin with, production costs would be drastically reduced because, once the required templates had been made, an ordinary machinist could easily turn out top quality machined parts therefrom. Production of the machined parts could be increased several-fold due to the ease and repeatable accuracy with which they could be reproduced. Furthermore, once the template was set up and the tracer stylus adjusted relative thereto, the action of the cutting tool on the workpiece would be largely automatic eliminating much of the human error involved in such operations. Finally, such a tracer unit would bring about a substantial reduction in waste while resulting in a considerably more uniform product than could possibly be produced on an individually-machined piece-work basis.

It has now been found in accordance with the teaching of the instant invention that the above and other worthwhile objectives can be achieved through the use of the novel and improved hydraulically-operated tracer unit of the present invention. Tracer units of one type or another are not unknown in the machine tool art; however, those used heretofore have proven to be of value in only the less exact operations where the required tolerances were of the order of plus or minus 0.001 inch rather than the plus or minus 0.0001 inch that it is possible to realize with the instant attachment. Also, the prior art devices for this purpose were found to be effective only for the reproduction of the simpler machined shapes such as, for example, cylindrical surfaces, and the reproducible accuracy maintained thereby fell off rather rapidly on the more complex ones incorporating curved surfaces, shoulders, grooves, ribs, etc. Many units for this purpose are exceedingly complicated, and therefore, expensive to say nothing of their high maintenance costs and the modifications often required in the engine lathes to receive same.

The tracer unit that forms the subject matter of the instant application, on the other hand, is actually rather simple when considered in the light of the fact that it is capable of reproducing a template edge surface to an accuracy of plus or minus 0.0001 inch over and over again. The construction is such that the hydraulic control valve and associated tool holder assembly are detachably connectable to any of the more or less standard compound rests found on the commercially-available engine lathes.

It is, therefore, the principal object of the present invention to provide a novel and improved tracer unit for use on engine or turret lathes, said unit including a hydraulically-operated control valve element, a piston actuated cutting tool assembly operated thereby, a pump, a template holder and adjustable support therefor.

A second objective is the provision of a tracer unit of the type aforementioned that is capable of accuracies in the order of plus or minus 0.0001 inch in duplicating the template configuration.

Another object of the invention is to provide an engine lathe tracer that is detachably connectable to the standard compound rest and which may be quickly removed therefrom when not in use.

Still another objective is the provision of a hydraulic tracer that is operable by relatively unskilled machinists to duplicate even complicated machined surfaces to the aforementioned tolerances.

An additional object of the invention is to provide a tracer unit which makes it possible to increase production rates for complex machined parts several-fold with the attendant reduction in labor costs while eliminating much of the waste that ordinarily occurs.

Further objects are to provide a tracer unit of the class described which is relatively inexpensive, extremely versatile, reliable, substantially maintenance-free, compact, lightweight, decorative in appearance and so constructed that any pulsation, expansion or contraction of the high pressure inlet hoses will not affect the accuracy thereof.

Other objects will be in part apparent and in part pointed out specifically hereinafter in connection with the description of the drawings that follows, and in which.

Figures 1, 2:
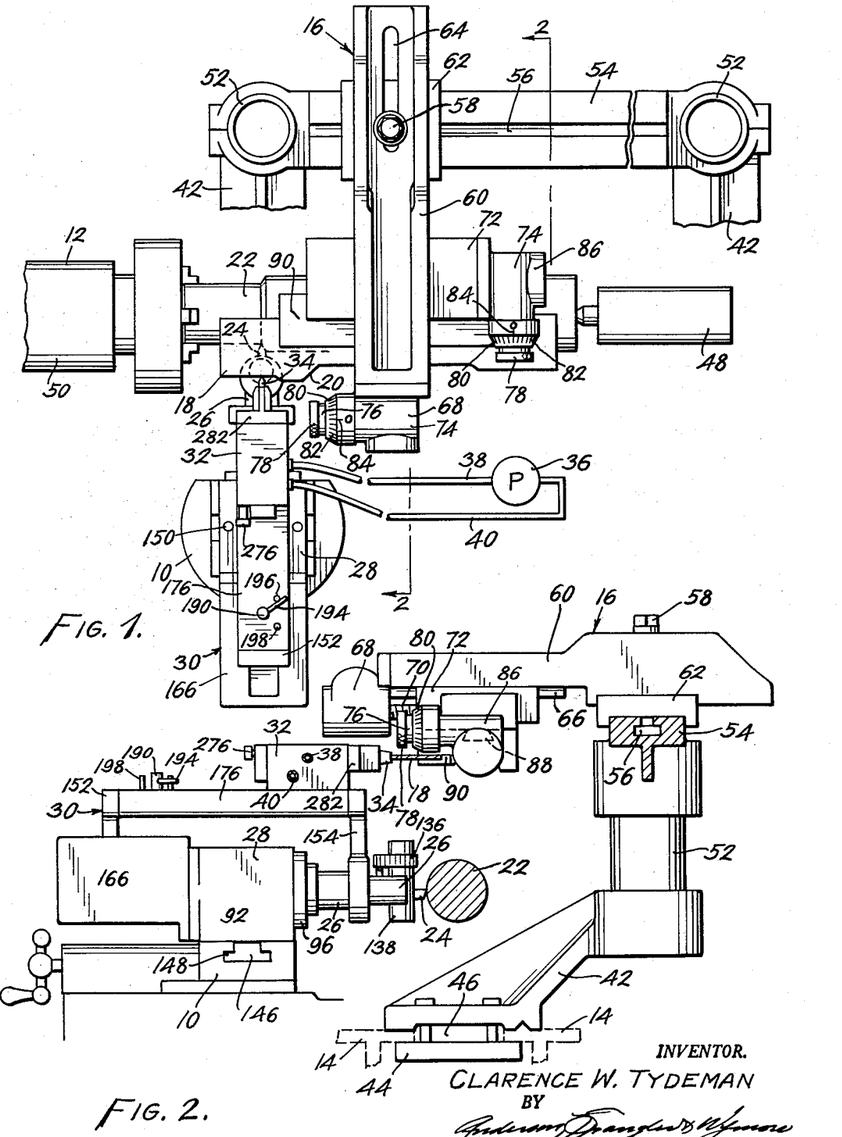
FIGURE 1 is a fragmentary top plan view showing the stylus-operated hydraulic control valve and associated tool holder assembly actuated thereby mounted in place on the compound rest of an engine lathe with the control valve stylus following the template held in position on the adjustable mount therefor.
FIGURE 2 is a fragmentary section taken along line 2—2 of FIGURE 1.

Referring now to the drawings for a detailed description of the tracer unit of the present invention, and in particular to FIGURES 1 and 2 for this purpose, it will be seen that reference numeral 10 represents a compound rest of an engine lathe 12 having a bed 14 (FIGURE 2) on which is mounted the adjustable template support bridge assembly that has been designated broadly by number 16. A template 18 having an edge 20 shaped to conform with the turned surface desired on the workpiece 22 is adjustably held in the bridge assembly 16 in a manner which will be explained in detail presently.

The cutting tool 24 is clamped within the end of quill 26 which is mounted for reciprocating movement within the hydraulic cylinder 28 of the tool holder assembly that has been designated in a general way by numeral 30. The movement of quill 26 within cylinder 28 is controlled by a hydraulic control valve unit that is referred to broadly by numeral 32 and which carries a stylus 34 that moves along the formed edge 20 of template 18 functioning to maintain the cutting tool 24 in an operative relationship to the cutting tool such that the contoured surface is reproduced on the workpiece with tolerances of plus or minus 0.0001 inch. A pump 36 such as the type that forms the subject matter of my copending application Serial Number 114,386, now United States Patent Number 3,048,119, supplies hydraulic fluid at a substantially constant pressure and temperature to the control valve 32 by means of intake and return lines 38 and 40, respectively.

Template support bridge assembly 16 will be seen to include a pair of arms 42 detachably mounted on the lathe bed 14 by suitable brackets 44 which, in the particular form shown, clamp within the longitudinal groove 46 that receives the tail stock 48 for slidable movement relative to the stationary headstock 50. These arms 42 are arranged in longitudinally spaced relation to one another and extend upwardly and rearwardly from the bed so as to clear the workpiece and leave the front open for the operator. The rear extremities of these arms are topped by upright post elements 52 that provide support for longitudinal track 54 extending therebetween. Track 54 is provided with an inverted generally T-shaped groove 56 extending in the direction of its length which receives a headed fastener 58 that connects transverse arm 60 thereto for longitudinal adjustment.

Arm 60 is provided on its underside with a generally channel-shaped slide block 62 which receives the track 54 in a manner to maintain a substantially perpendicular relation therebetween in all adjusted positions. Thus, by loosening fastener 58, arm 60 can be adjusted longitudinally relative to the lathe bed and workpiece 32; whereas, transverse adjustment can be accomplished in a similar manner by means of slot 64 through which the fastener passes into position within the groove in track 54. The aforementioned adjustments are obviously rather coarse ones and not designed to position the template accurately with respect to the workpiece.

A dovetail slide 66 extends in the direction of the length of arm 60 on the underside thereof beginning at its front end adjacent the operator. Arm 60 also carries on its front or forward end, a transverse micrometer adjustment fitting 68 of a type well known in the art which includes a screw 70 threadedly connected within a slide block 72 mounted for transverse slidable movement on dovetail slide 66 of arm 60. Rotation of screw 70 causes the slide block to move either forwardly or rearwardly relative to the workpiece thus accomplishing fine adjustment of the template 18 operatively associated therewith. Screw 70, as illustrated, is mounted for rotation within housing 74 and carries a worm gear (not shown) on the forward end thereof. This worm gear, in turn, meshes with a worm that has also not been shown but which is carried on the inner end of worm shaft 76 that is mounted for rotation in housing 74 at right angles to screw 70. A knurled knob 78 accessible to the operator is used to turn the worm shaft and shift the position of the slide block by means of screw 70. A collar 80 carrying a scale 82 calibrated in tenths of a thousandth of an inch is carried by the worm shaft 76 for rotation therewith relative to fixed index 84.

Slide block 72 carries on its right end as viewed from the position occupied by the operator in FIGURE 1, a longitudinal micrometer adjustment fitting 86 that operates in the same manner as the transverse adjustment fitting 68 already described in detail above; therefore, the same reference characters have been used to identify analogous parts in both units. The underside of slide block 72 is provided with a longitudinally extending dovetail slide 88 (dotted lines in FIGURE 2) onto which is mounted for relative longitudinal slidable movement a template holding clamp 90 which is operatively connected to the screw (not shown) of longitudinal micrometer adjustment unit 86. The template 18 is clamped or otherwise attached to the template holding clamp such that the formed edge 20 thereof faces the operator in position to be followed by the stylus 34 of the hydraulic control valve 32. Thus, micrometer units 68 and 86 provide means by which the operator may accurately position template 18 relative to the workpiece 22 both longitudinally and transversely once the coarse adjustments have been made by positioning arm 60 relative to track 54.

The workpiece 22 is clamped within the rotatable headstock 50 of the lathe 12 in the customary manner while the spindle of the tailstock 48 is used to support the other end for rotational movement. In many instances the hydraulic control valve and tool holder assembly will be removed from the compound rest and a conventional lathe tool holder substituted therefor while the rough-shaping of the workpiece is accomplished. Then, the tracer unit will be used to perform the precision finished operations on the workpiece where the extreme accuracy is required. The tracer unit of the present invention can, of course, be used for the entire machining operation if desired.

Figure 3:
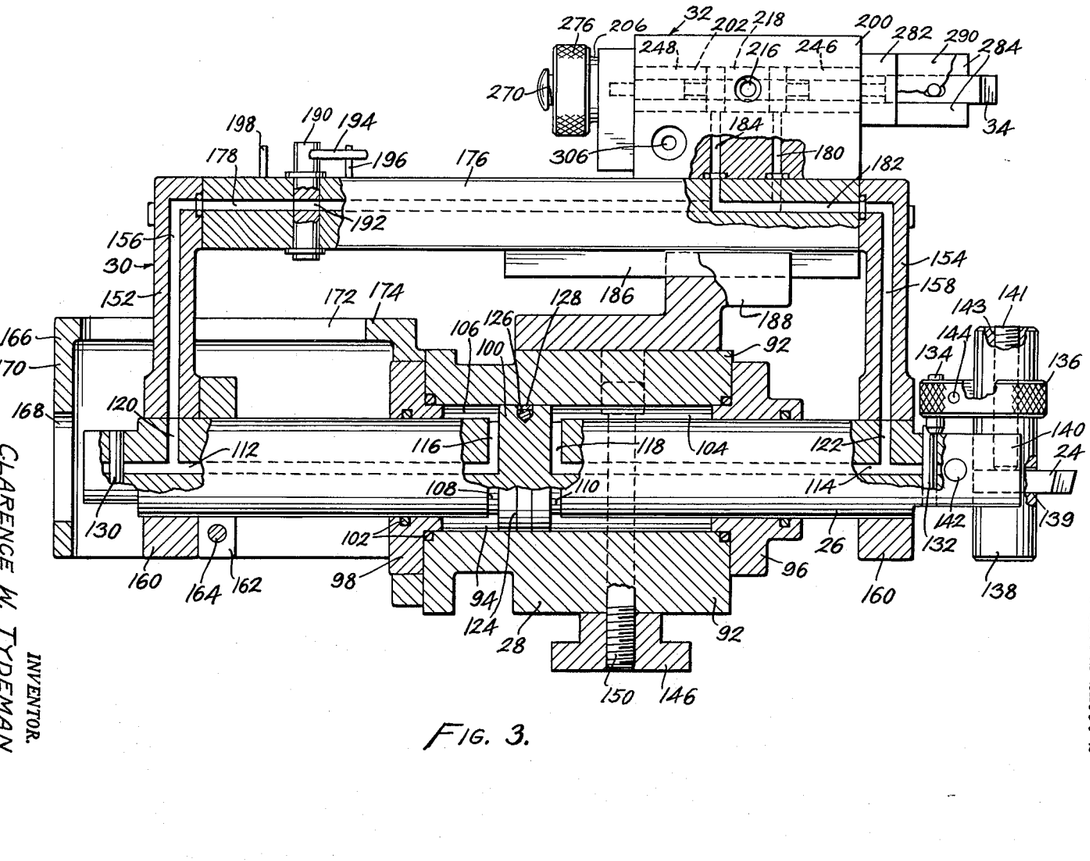
FIGURE 3 is an enlarged side elevation, several portions of which have been broken away and shown in section, of the control valve and hydraulically-operated tool holder assembly actuated thereby.

The attention is now directed to FIGURE 3 of the drawing wherein the hydraulic control valve 32 and tool holder assembly 30 of the tracer unit have been shown occupying their operative positions in relation to one another. The cylinder 28 comprises a casing 92 having a longitudinal bore 94 therein closed at opposite ends by front and rear endplates 96 and 98, respectively, together with the quill 26 that is mounted for reciprocal movement therein. Functionally, the quill 26 is analogous to the piston rod of a double-acting hydraulic piston 100 mounted for reciprocal movement in bore 94 between the endplates 96 and 98 of the cvylinder 28. The endplates 96 and 98 are each attached to opposite ends of the casing in a manner to provide a fluid-tight seal therebetween due to the presence of O-ring seals 102. Similar seals are provided between the quill 26 and openings therefor in the endplates. The piston 100 which is located intermediate the ends of the quill and comprises an annular integrally-formed enlargement thereon divides the bore into front and rear annular cavities 104 and 106, respectively, that vary in length and volume depending upon the location of said piston therein. Annular grooves 108 and 110 are provided on the quill on opposite sides of the piston which communicate with axial openings 112 and 114, respectively, by means of radial passages 116 and 118. Other radial passages 120 and 122 connect into the axial openings 112 and 114 and emerge onto the surface of the quill 26 outside the cylinder 28 thus providing means by which hydraulic fluids may be introduced into either one of the annular cavities while being withdrawn from the other.

Piston 100 also contains a continuous annular groove 124 having a generally V-shaped bottom in the particular form illustrated herein which receives O-ring seal 126. This O-ring is placed under pre-load compression by metal piston ring 128 that encircles the O-ring and provides an efficient fluid-tight seal preventing the passage of hydraulic fluid between annular cavities 104 and 106. The seal just described which separates the annular cavities of the cylinder is extremely important to the operation of the tracer unit of the present invention because any leakage past the piston seriously reduces the tolerances obtainable on the workpiece. For this reason, one or more high pressure hydraulic seals of the type which form the subject matter of my copending application Serial Number 543,765, now U.S. Patent 2,892,645, are preferred. A fluid-tight fit between the endplates, cylinder casing 92 and quill 26 is also critical in order to maintain the desired tolerances on the workpiece. Accordingly, the mating surfaces of the endplates and cylinder casing are preferably hardened and ground flat to insure a proper fit even though O-rings 102 are also employed therebetween. Despite the fact that high pressure fluid seals of the type illustrated between the cylinder wall and piston have not been shown used as the packing gland for the quill, such a seal could be employed to good advantage in this location, also, especially when it is considered that relative movement between the quill and cylinder heads takes place which will, in time, wear an ordinary O-ring.

The axial openings 112 and 114 in opposite ends of the quill are customarily bored which means that they must be plugged to prevent the escape of fluid therefrom. Pin 130 in the rear end of the quill intersecting opening 112 beyond radial passage 120 provides such a plug. A similar pin 132 on the other end of the quill intersecting axial opening 114 provides the front plug and also functions as a stop adapted to cooperate with pin 134 carried by knurled ring 136 in locating cutting tool 24 as will be explained presently.

Tool holder 138 of the tool holder assembly is cylindrical and includes a radial socket 139 adapted to receive the cutting tool 24 non-rotatably. The tool is removably held within the tool holder by means of a set screw 141 threaded into an axial opening 143 intersecting the socket. The tool holder 138 fits into a cylindrically-shaped opening adapted to receive same that is provided in the forward extremity of the quill 26. This cylindrical opening is, however, truncated by the front end of the quill thus providing a cylindrical surface greater than 180° for purposes of retaining the tool holder but substantially less than 360° so that the tool 24 can be adjusted from side-to-side through an arc of about 90° before it contacts the end of said quill. In other words, the tool holder opening preferably encompasses a cylindrical surface of about 270° having a 90° gap for swinging the tool from side-to-side while providing a pair of jaw-forming portions 140 that can be clamped tightly against the tool holder by means of draw screw 142.

Knurled ring 136 contains an eccentrically located opening adapted to receive the tool holder as shown. This ring is split radially and provided with a draw screw 144 adapted to close the gap for purposes of clamping same onto the tool holder. Stop pin 134 is located adjacent the split in the ring and generally opposite the eccentric tool holder opening in position such that it contacts the stop pin 132 projecting from the quill when the tool holder is turned about its vertical axis. Thus, knurled ring 136 and pin 134 that depends therefrom provide means whereby the height of tool 24 relative to the quill 25 may be adjusted as pin 134 rests on the top of the quill as shown. Also, these same elements cooperate with pin 132 to locate tool 24 angularly in any desired adjusted position. In other words, the height of tool 24 can be adjusted by varying the height of ring 136 on the tool holder and it can be adjusted angularly by turning said tool holder within the ring. Once adjusted, the assembly comprising the tool 24, tool holder 138, ring 136 and pin 134 can be removed from the quill, serviced or examined, and replaced again without altering the position of the tool relative to the quill due to the fact that pins 132 and 134 cooperate with one another to reposition the entire assembly.

The bottom of the cylinder block 92 is provided with a generally T-shaped bracket 146 adapted to fit within the T-shaped slot 148 in the compound rest 10 of an engine lathe in the same manner that is used to mount other tool holders thereon. Bolts 150 passing through the cylinder on opposite sides of the bore 104 are used to fasten the clamp bracket 146 to the cylinder block 92. The connection just described between the compound rest and cylinder block is such as to provide the same adjustments, different positions, etc. ordinarily available with any of the commercially-available tool holders mounted thereon.

Opposite ends of the quill projecting beyond the cylinder heads carry upright bridge support members 152 and 154, each of which includes a fluid passage 156 and 158, respectively, adapted to register with passages 120 and 122 in the quill. The lower extremity of both the front and rear bridge support elements terminates in an integrally-formed split ring 160 sized and adapted to receive the corresponding end of the quill with a fluid-tight fit. A split collar 162 with a draw screw 164 is clamped onto the rear end of the quill ahead of support 152 for the purpose of maintaining the latter in place as shown.

In the particular embodiment illustrated herein, an open bottomed quill cover 166 is attached to the rear end of the cylinder block in position to protect the quill. This quill cover has an opening 168 in the rear wall 170 thereof adapted to receive the rear end of the quill when in fully retracted position and also a longitudinal slot 172 in the top wall 174 which permits the rear bridge support to move to-and-fro therein. A cover of this type, which not essential to the operation of the instant device, does protect a major portion of the quill against dirt, shavings, turnings and the like that might otherwise work their way into the cylinder damaging the seals, etc.

A bridge element 176 interconnects the bridge supports extending along the top of the cylinder 28 in vertically spaced relation thereto. A first fluid passage 178 opens onto the rear end of the bridge element 176 and connects into passage 156 of support 152. The front end of first passage 178 opens onto the top of the bridge where it connects into the front end of the control valve 32 by means of passage 180.

A second fluid passage 182, on the other hand, opens onto the front end of the bridge element and connects into passage 158 of support member 154. The rear end of this second passage 182 also opens onto the top of the bridge in position to receive fluid from and deliver fluid to the control valve 32 through passage 184. While passages 178 and 182 generally parallel one another within the bridge element, they are not interconnected. It is these passages along with those in the bridge supports, quill and control valve connected thereto that provide the means by which the piston is reciprocated within the cylinder depending, of course, on which system is employed as an inlet for the hydraulic fluid while the other serves as an exhaust therefor.

The underside of bridge element 176 is provided with a longitudinal rib 186 that cooperates with a corresponding groove in Z-shaped support 188 to produce a guideway adapted to maintain the quill correctly oriented with the cylinder. Bridge 176 also serves as a support for the control valve 32 which rests on top thereof as shown.

A shut-off valve 190 is mounted on the bridge element for rotational movement between an open position in which a passage 192 therethrough is aligned with passage 178 and a closed position wherein the latter passage is blocked thus preventing either delivery or discharge of fluid from the rear end of piston 100. An arm 194 projecting from the valve contacts stop 196 carried by the bridge when in open position and a second stop 198 when closed.

The body 200 of the control valve 32 is mounted on the bridge element in fluid-tight sealed relation thereto and in position such that passages 180 and 184 communicates with passages 178 and 182, respectively, in the bridge. Passages 180 and 184 open into the bore 202 that houses the reciprocating spool valve 204 and associated elements soon to be described in detail in connection with the remaining figures of the drawing. The spool valve assembly provides the operative connection between the stylus 34 and tool 24 such that the former controls the movements of the latter. A hand-operated retraction assembly 206 for use in withdrawing the stylus 34 from the edge of the template completes the description of those features of the control valve 32 that are revealed in FIGURE 3. Additional details of the control valve are revealed in FIGURE 4 to which reference will now be made.

Figures 4, 8:
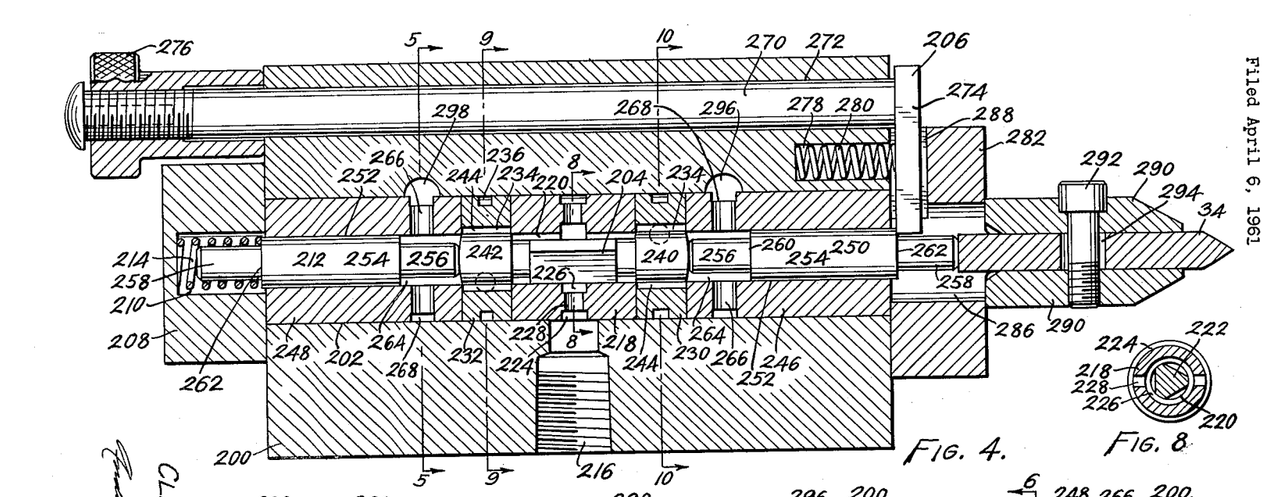
FIGURE 4 is a further enlarged longitudinal section of the control valve alone.
FIGURE 8 is a section through the servo-spool and push rods of the control valve taken along line 8—8 of FIGURE 4.

Valve body 200, as aforementioned, is provided with a longitudinal bore 202 opening onto both the front and rear ends thereof. The rear end is closed by a coverplate 208 having an axially-aligned socket 210 therein adapted to receive rear push rod 212 of the spool valve assembly and also compression spring 214 that biases the latter forwardly so as to urge the stylus 34 into contact with the contoured edge of the template. Hydraulic fluid under relatively high pressure and a nominal temperature from pump 36 enters the bore 202 through intake port 216 in the side of the valve body located approximately mid-way between the ends thereof.

At this point in the valve body bore is positioned the central hollow cylindrical element 218 of five similar elements arranged in end-to-end relation that house the spool valve assembly. This central cylindrical element is a right cylinder of a diameter adapted to fit within the valve body bore and form a substantially fluid-tight seal therewith.

At this point it will be advantageous to refer to both FIGURES 4 and 8 while completing the detailed description of the central cylindrical element 218 and portions of the spool valve assembly associated therewith. The axial bore 220 in this central cylindrical element is sized to receive the center section 222 of the spool valve 204 for reciprocal sliding movement therein. The outer cylindrical surface of element 218 contains an annular groove 224 located to receive the hydraulic fluid from the inlet port 216 and conduct same into a second annular groove 226 on the inside cylindrical surface by means of radial passages 228 provided for this purpose. The front and rear ends of this central hollow cylindrical element terminate short of the ends of the spool valve which extend into front and rear intermediate hollow cylindrical sections 230 and 232, respectively, that are located on opposite ends of said spool valve. At this point without going into a detailed description of the construction of spool valve 204 which will be deferred until later, it should suffice to point out that when the latter is shifted forwardly from its normal or inoperative position shown in FIGURE 3, the hydraulic fluid entering the intake port 216 will be conducted to the front end of element 218 where it is allowed to escape into front intermediate element 230 for delivery into passage 180 and the rear end of the hydraulic cylinder 28. Conversely, when the spool valve is moved rearwardly or retracted, the fluid will be passed into the front end of the hydraulic cylinder through rear intermediate element 232 and passage 184.

Figure 9:
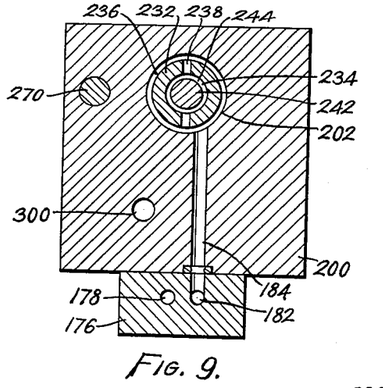
FIGURE 9 is a section taken along line 9—9 of FIGURE 4.
Figure 10:
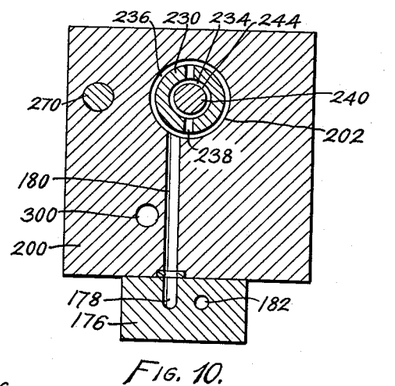
FIGURE 10 is a section taken along line 10—10 of FIGURE 4.

With reference now to FIGURES 3, 9 and 10, it will be seen that both the front and rear hollow cylindrical intermediate elements 230 and 232 are identical and include an axial bore 234 and an outer annular grove 236 interconnected by one or more radial passages 238. The outer annular groove 236 opens onto the valve body bore adjacent one of the passages 180 or 184 in position to either deliver or receive fluid therefrom.

The axial bore 234 of elements 230 and 232 has a somewhat greater diameter than that of central element 218, the bore 220 of the latter being of a size to receive the cylindrical end portions 240 and 242 of the spool valve 204 with a substantially fluid-tight sliding fit when the spool valve assembly is in either its extended or retracted position. With the central section 222 of the spool valve in normal or inoperative position, the end portions 240 and 242 thereof are located entirely within the front and rear intermediate elements 230 and 232 thus defining therewith continuous annular cavities 234 and 244 between the opposed cylindrical surfaces.

Figure 5:
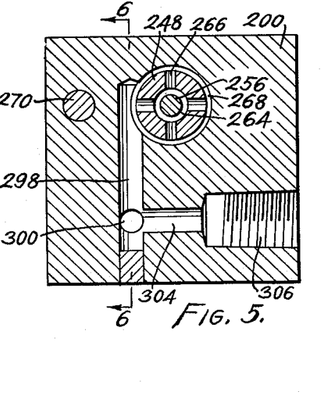
FIGURE 5 is a transverse section at a slightly reduced scale taken along line 5—5 of FIGURE 4.
Figures 6, 7:
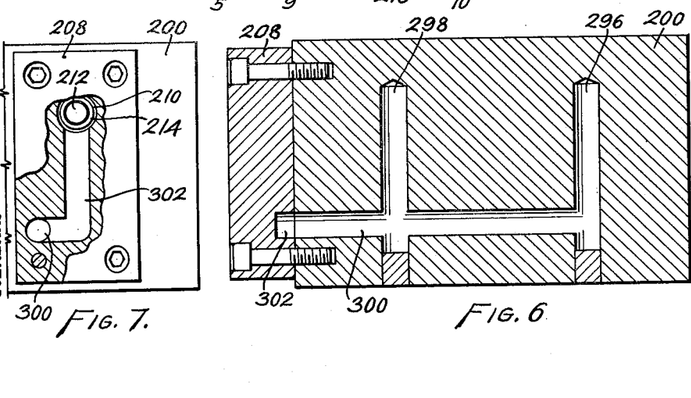
FIGURE 6 is a vertical section at the same scale as FIGURE 5 taken along line 6—6 of FIGURE 5.
FIGURE 7 is a rear elevation of the control valve, portions of which have been broken away and shown in section while others have been broken away to conserve space.

In FIGURES 4 and 5 the front and rear hollow cylindrical elements 246 and 248, respectively, that fit into opposite ends of the valve body bore and house front and rear push rods 250 and 212 of the spool valve assembly have been illustrated. These front and rear hollow cylindrical elements contain an axial bore 252 of the same diameter as that of the central section 218 and they therefore receive the end portions 240 and 242 of section 222 of the valve assembly with a substantially fluid-tight fit when said section is in either its extended or retracted position. Both of the push-rods are fabricated to provide a central cylindrical portion 254 sized to fit within the bore 252 with a sliding substantially fluid-tight fit; whereas, the interior and exterior end portions 256 and 258 of said push rods are of reduced diameter being separated from the central portion by annular shoulders 260 and 262. Shoulder 262 and reduced section 258 of the rear push-rod cooperate with the socket 210 in the coverplate 208 to provide axially spaced abutments and alignment means for compression spring 214 as clearly indicated in FIGURE 4. Both interior reduced sections 256 of the push-rods cooperate with the bore 252 of the front and rear hollow cylindrical elements 246 and 248 to define continuous annular cavities 264 that connect into an exhaust system through radial passages 266 and annular groove 268 that interconnects the latter. The interior reduced sections of the push-rods also contact the adjacent end portions 240 and 242 of the spool valve forming therewith and with stylus 34 a continuous spring-biased push-rod linkage adapted to urge the stylus into contact with the contoured edge of the template.

The hand-operated retraction assembly 206 is used to manually retract the spool valve assembly so that fluid will be delivered to the front end of cylinder 28 thus withdrawing tool 24 from the workpiece. This retraction assembly is revealed most clearly in FIGURE 4 where it will be seen to include a rod 270 mounted for longitudinal slidable movement within opening 272 in the valve body that parallels the spool valve assembly bore at one side thereof. The front end of rod 270 projects beyond the front face of the valve body where it carries a foot 274 that extends laterally into position to engage the shoulder 262 on the forward end of the front push rod. The other or rear end of the rod is threaded to receive knurled actuating knob 276 for rotational movement, the latter contacting the rear face of the valve body. The front face of the valve body contains a socket 278 that houses a compression spring 280 which engages the foot 274 and biases the latter forwardly. Thus, by turning the knurled knob 276 in a direction to thread it off the rear end of the rod, foot 274 is freed for forward movement under the influence of compression spring 280 until it disengages the shoulder of the front push rod and allows the latter to contact the template and operate stylus 34. When, on the other hand, knob 276 is turned in a direction to draw the rod and foot associated therewith back against the shoulder of the front push rod in opposition to the action of spring 280, it shifts the spool valve assembly into the retracted position wherein fluid is delivered to the front of the cylinder withdrawing the tool tool.

Returning once more to FIGURES 3 and 4, it can be seen that the stylus holder comprises a faceplate 282 bolted on the front face of the valve body 200 with a pair of vertically-spaced substantially parallel fingers 284 projecting forwardly therefrom in position to receive the stylus 34 for longitudinal slidable movement therebetween. Block 282 has an opening 286 therein which is positioned to receive the projecting end portion 258 of the front push-rod and the rear end of the stylus which contacts the latter. A transverse slot 288 in the side of block 282 connects into opening 286 thereof and passes foot 274 of the retraction assembly into position for engagement with the front shoulder 262 of push-rod 250.

The width or transverse dimension of fingers 284 is slightly greater than the corresponding dimension of stylus 34 so that when slideplates 290 are drawn up tightly against opposite sides of the fingers with bolt 292, the stylus will still slide freely within the rectangular guideway thus formed. The stylus is retained in place within its guideway by bolt 292 which passes through an oversized opening 294 therein. Whenever it becomes necessary to remove the stylus, all that is required is the loosening of bolt 292 whereupon it, the stylus and slideplates 290 can be withdrawn from between the fingers as a unit.

Reference will now be made to FIGURES 4, 5, 6 and 7 for a detailed description of the exhaust assembly which is provided for the purpose of returning the hydraulic fluid to the pump reservoir. Front and rear exhaust passages 296 and 298, respectively, open into the bore 202 of the valve body adjacent the continuous annular grooves 268 on the outer surface of front and rear hollow cylindrical elements 246 and 248. The opposite ends of these exhaust passages open into a common passage 300 that, in turn, opens onto the rear face of the valve body where it connects with groove 302 leading from spring socket 210 in the endplate or cover 208. Branch exhaust passage 304 (FIGURE 5) connects into exhaust port 306 which opens onto the side of the valve body and is adapted to receive exhaust line 40.

It will thus be seen that when the slide valve assembly is shifted into its extended or operative position from the normal or inoperative position of FIG. 4, fluid under high pressure will enter intake port 216, pass into the interior of central hollow cylindrical element 218 through outer annular groove 224, one of the radial passages 228 and inner annular groove 226; whereupon, the fluid flows forwardly along the central spool valve section 222 into annular cavity 244, one of the radial passages 238 (FIGURE 10) and then to outer annular groove 236 as it leaves the valve body in passage 180. Then, from passage 180 the fluid is conducted rearwardly along the bridge in passage 178, down rear bridge support 152 in passages 156 and 120, and finally into the rear end of cylinder 28 through passages 112 and 116 in the quill. This, of course, moves the piston 100 forwardly in the cylinder urging the tool 24 into contact with the workpiece. As the piston moves forward in the cylinder, the fluid displaced from the front cavity thereof is conducted away into passage 184 of the valve body through annular groove 110, radial passage 118, longitudinal passage 114, vertical passages 122 and 158 in front bridge support 154, and passage 182 in the bridge. Within the valve body this exhaust fluid enters annular cavity 244 in the rear intermediate hollow cylindrical element 232, flows rearwardly past the extended rear end portion 242 of spool valve 204 into annular cavity 264 surrounding the inner end of rear push rod 212, out into passage 298 through one of the radial passages 266 and outer annular groove 268, and finally back to the pump reservoir through passages 300 and 304 along with exhaust port 306 and return line 40. Note also that any fluid which happens to leak along the mating surfaces of the valve body bore and hollow cylindrical elements will either be drained back to the reservoir through one of the exhaust passages 296 or 298 or else groove 302 in the coverplate 208.

As has already been mentioned briefly, the stylus and control valve therefor move as a unit with the bridge and quill which means, of course, that as soon as the stylus contacts the contoured edge 20 of template 18, the spool valve assembly will be shifted rearwardly against the action of compression spring 214 until it reaches its normal or inoperative position; whereupon, the supply of fluid being delivered to the rear end of cylinder 28 for purposes of extending the quill will be shut off holding the tool in fixed position as long as the stylus is traversing a surface that is normal to the axis of movement thereof. Thus, if the contoured edge of the template slopes away from the point of the stylus, it will move forward incrementally releasing fluid once again to the rear end of the cylinder until the tool has again extended to the point where the valve assembly carried by the quill returns to its normal or inoperative position. Conversely, if the contoured surface of the template slopes toward the stylus, the spool valve will be retracted rearwardly beyond its inoperative position thereby introducing fluid into the front end of the cylinder so as to withdraw the quill and associated tool incrementally in the same manner that it was extended in the previous illustration. Actually, while traversing any inclined surface, the spool valve remains shifted the amount required to admit fluid to the cylinder and maintain the tool in precisely the same relative position with respect to the stylus rather than accomplishing the foregoing with an intermittent operation. Obviously, the greater the incline on the contoured edge of the template, the greater volume of fluid that is delivered to the cylinder in order to maintain the relative positions of the tool and stylus.

Figure 11:
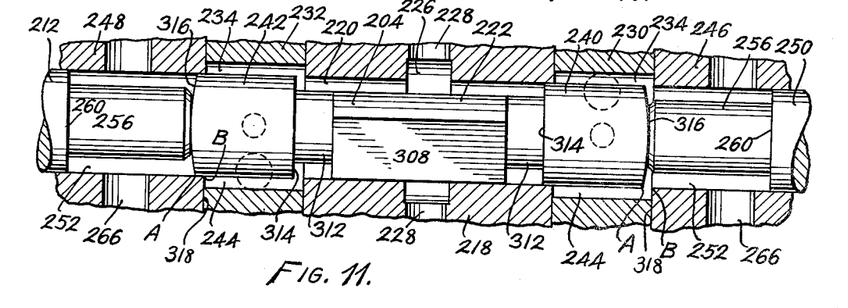
FIGURE 11 is a still further enlarged longitudinal section showing the servo-spool, push rods and related elements of the control valve.

Perhaps the single most critical element of the tracer assembly, namely, the spool valve 204 of the spool valve assembly remains to be described in connection with FIGURES 11, 12 and 13 to which reference will now be made. The length of central section 222 of the spool valve 204 is substantially less than that of central hollow cylindrical element 218 and comprises a cylinder of the size of the inside diameter of the bore in said hollow cylindrical element truncated longitudinally by three planes providing planar surfaces 308 disposed at an angle of approximately 120° relative to one another and intersecting the cylindrical surface to leave narrow cylindrical bands 310 bordered by spaced parallel edges that are also parallel to the axis of the bore. These cylindrical portions 310 provide essentially three-point sliding contact with the inside cylindrical surface of central hollow cylindrical element 218; whereas, the planar faces 308 enable the hydraulic fluid entering radial passages 228 and annular groove 226 to flow either forwardly or rearwardly along the central spool valve section depending on which direction the latter is shifted. Obviously other constructions than that shown will permit the fluid to flow in this manner while maintaining the spool valve properly centered within element 218; however, the one shown is easily machined. Cylindrical sections 312 of reduced diameter separate the central section 222 from the end sections 240 and 242 which are cylindrical also but of the same outside diameter as the inside of the bore in hollow cylindrical element 218. The combined lengths of central section 222 and reduced cylindrical section 312 is equal to the length of the central hollow cylindrical element 218. Thus, when the spool valve 204 is shifted into either extended or retracted position from its inoperative position, the fluid can pass without restriction into the annular cavity 244 that exists between the end section of the spool valve and the cylindrical surfaces defining the enlarged bores of intermediate hollow cylindrical elements 232 and 230. Accordingly, with the spool in its normal or inoperative position shown in FIGURE 4, the shoulders 314 that separate the end sections of the spool valve from the reduced cylindrical sections thereof close the open ends of central hollow cylindrical element 218. This seal is not fluid-tight, of course, but it is substantially so. When, however, the spool valve is shifted as shown in FIGURE 11, one of the end sections 240 or 242 of the spool valve moves into the axial bore of hollow cylindrical element 218 producing a true fluid-tight seal when it is considered that the fluid is allowed to flow freely out the opposite end which is open.

One of the critical dimensions of the spool valve is the longitudinal spacing between shoulders 314 which, in the preferred embodiment of the invention should be within 0.0001 of the length of the central hollow cylindrical element 218 if the tracer assembly is to hold tolerances of this degree of accuracy. These shoulders are parallel, planar and normal to the axis of reciprocal movement. In practice the spacing between shoulders 314 on the spool valve is ground to the exact length of central hollow cylindrical element 218 within plus or minus 0.0001 or less whenever possible.

Now, the combined lengths of central hollow cylindrical element 218 and the adjacent intermediate hollow cylindrical elements 232 and 230 can be measured quite accurately. It would appear, therefore, that the overall length of spool 204 should be equal to the combined lengths of the central and intermediate hollow cylindrical elements; however, it has been found that when this is done the spool valve develops a chatter under certain conditions which eliminates any chance of maintaining the desired tolerances on the workpiece. Also, a momentary pressure build-up sometimes occurs when the spool valve is shifting that either forces rear push rod 212 back against the action of compression spring 214 or the front push rod forward against the stylus with more force than the few ounces exerted by said spring.

The foregoing problems can be overcome very simply by machining a cylindrical surface 316 on opposite ends of the spool valve. The radius about which these cylindrical end surfaces are ground is selected such that with the spool valve in its centered or inoperative position, the end portions 240 and 242 thereof project slightly into the mouth of the front and rear hollow cylindrical elements 246 and 248 while, at the same time leaving small gaps between the edge of the cylindrical end surfaces 316 and the adjacent edge of shoulder 318 defined between the intermediate and front and rear hollow cylindrical sections.

Figure 12:
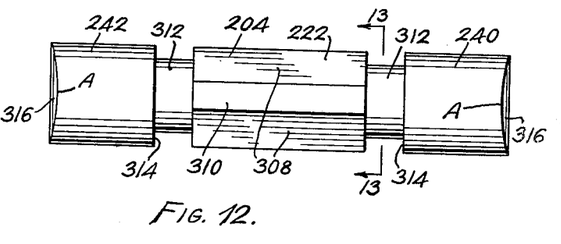
FIGURE 12 is a detail showing the servo-spool of the control valve alone.
Figure 13:
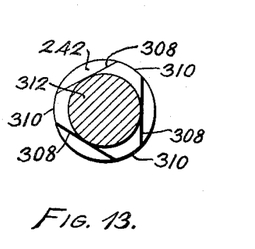
FIGURE 13 is a transverse section taken along line 13—13 of FIGURE 12.

From the practical standpoint, experiments have shown that with the spool valve centered in normal position within the central hollow cylindrical element, a gap of approximately 0.001 inch should be left between points A on the end sections of the spool valve in FIGURES 11 and 12 and the adjacent points B on the edge of the front and rear hollow cylindrical elements 246 and 248 (FIGURE 11). For example, in an assembly wherein the measured linear distance separating the shoulders 318 was found to be 1.1226 inches, by machining the spool valve having a diameter of 0.250 inch to a maximum linear dimension of 1.1476 inches, a gap between points A and B of 0.0012 inch was provided while the crown on the end sections projected into the bore of the front and rear hollow cylindrical sections approximately 0.0125 inch. Such an assembly performed quite satisfactorily and was capable of reproducing the contoured surface of a template to tolerances of plus or minus one ten-thousandth. Note that one of the main advantages of the spool valve construction just described is that once the spacing between shoulders 314 thereof has been carefully machined to correspond with the length of hollow cylindrical section 218, the linear distance between shoulders 318 has been measured and the necessary maximum linear dimension of the spool valve has been calculated which will provide approximately a 0.001 gap between points A and B in normal or inoperative position, it becomes a simple matter to mount the spool for rotation about a transverse axis passing through its center and machining the cylindrical surfaces on its end section. A further advantage of this construction is the fact that the exhaust end of the spool valve will open at a slower rate than the inlet end thereof due to the fact that the exhaust end of the spool value will open even in normal position, the crown thereof projects into the corresponding hollow cylindrical end element so it will not open completely until the inlet end is fully open.

One other point is worthy of mention, namely, that the cross-sectional area encompassed by the passages which comprise the exhaust manifold is substantially greater than that of the intake passages thus preventing any build-up of fluid pressure in annular cavities 264 which would tend to compress spring 214 and render the system less accurate.

Having thus described the several useful and novel features of the hydraulic tracer assembly for engine lathes of the present invention, it will be seen that the many worthwhile objectives for which it was designed have been achieved. Although but a single specific embodiment of the invention has been illustrated in the accompanying drawings, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. A tracer attachment for mounting upon the carriage of a lathe bearing a template and workpiece, said tracer attachment comprising: a stylus adapted to be borne in contiguous relationship with the template, an hydraulically operated control valve intimately associated with the stylus and responsive to reciprocal movement imparted to the stylus, for reciprocal movement therewith, biasing means urging said control valve toward said stylus, and urging said stylus towards the template, an hydraulically operated double-acting piston for reciprocal movement in response to said movement of the control valve, composed of a head and quill, said quill having on each side of the head an axial fluid passage and at least two radial fluid passages, being a head side passage and a tail side passage, for ingress to and egress from said axial fluid passage to a side of the head, a housing for the control valve, a housing for the piston, a cutting tool detachably carried at one end of the quill, a bridge mounted upon the quill at the other end thereof and at said one end thereof behind the cutting tool, bridging the housing for the piston and mounting the housing for the control valve, bridge fluid passage means for hydraulic fluid communication between the housing for the control valve and each tail side passage of the quill, a source of hydraulic fluid pressure and reservoir therefor, hydraulic fluid intake and exhaust means for the housing for the control valve respectively connected to said source and said reservoir, an hydraulic fluid circuit interconnecting both housings, the bridge fluid passage means and each said axial and radial fluid passages to the source and reservoir; wherein hydraulic fluid under pressure directed initially from the source to the hydraulic fluid intake means for the housing for the control valve, adjacent said control valve, is caused to be fed to the housing for the piston via the circuit for pressure engagement with either side of said head in response to substantially identical movement of the control valve thereby to advance or retract the cutting tool with respect to the longitudinal axis of the workpiece in conformity with the template and thereby to force residual hydraulic fluid on the opposite side of said either side of the head to the reservoir.

2. A tracer attachment for mounting upon the carriage of a lathe bearing a template and workpiece, said tracer attachment comprising: a stylus adapted to be borne in contiguous relationship with the template, an hydraulically-operated control valve intimately associated with the stylus and responsive to reciprocal movement imparted to the stylus, for reciprocal movement therewith, biasing means urging said control valve towards said stylus, and urging said stylus towards the template, an hydraulically-operated double-acting piston, for reciprocal movement in response to said movement of the control valve, and being composed of a head and quill, said quill having on each side of the head an axial fluid passage and at least two radial fluid passages, being a head side passage and a tail side passage, for ingress to and egress from said axial fluid passage to a side of the head, a housing for the control valve, a housing for the piston, a cutting tool detachably carried at one end of the quill, a bridge, composed of a front and a rear upstanding support and a bridge element intermediately fixed to the top of each support, each support having a fluid conduit therethrough, and the bridge element having at least two separate fluid conduits, one of said two separate conduits adapted to be held in fluidtight relationship with the conduit in the front support, the other of said two separate fluid conduits adapted to be held in fluidtight relationship with the conduit in the rear support, said bridge being mounted upon the quill for fluidtight connection between the conduit in the rear support and a tail side radial passage, and between the conduit in the front support and the other tail side radial passage, said bridge element being in spaced underlying relationship with respect to the housing for the control valve for fluidtight connection with each of said two separate conduits, a source of hydraulic fluid pressure and reservoir therefor, an hydraulic fluid circuit interconnecting the source and reservoir with the housing for the control valve, for fluidtight connection to said two separate conduits; wherein hydraulic fluid under pressure directed initially from the source to the housing for the control valve, adjacent said control valve, is caused to be fed, therefrom through either one of said two separate conduits to a side of the head for pressure engagement therewith, in response to substantially identical movement of the control valve thereby to advance or retract the cutting tool with respect to the longitudinal axis of the workpiece in conformity with the template and thereby to force residual hydraulic fluid on the opposite side of a side of the head to the reservoir.

3. A tracer attachment for mounting upon the carriage of a lathe bearing a template and workpiece, said tracer attachment comprising: a stylus adapted to be borne in contiguous relationship with the template, an hydraulically-operated control valve intimately associated with the stylus and responsive to reciprocal movement imparted to the stylus, for reciprocal movement therewith, biasing means urging said control valve towards said stylus, and urging said stylus towards the template, an hydraulically-operated double-acting piston, for reciprocal movement in response to said movement of the control valve, and being composed of a head and quill, said quill having on each side of the head an inelastic axial fluid passage and at least two inlastic radial fluid passages, being a head side radial passage and a tail side radial passage for ingress to and egress from said axial fluid passage to a side of the head, a housing for the control valve, a housing for the piston, a cutting tool detachably carried at one end of the quill, a bridge, composed of a front and a rear upstanding bridge support and a bridge element intermediately fixed to the top of each support, each support having an inelastic fluid conduit therethrough, and the bridge element having at least two inelastic separate fluid conduits, one of said two separate conduits adapted to be held in fluidtight relationship with the conduit in the front support, the other of said two separate fluid conduits adapted to be held in fluidtight relationship with the conduit in the rear support, said bridge being mounted upon the quill for fluidtight connection between the conduit in the rear support and a tail side radial conduit, and between the conduit in the front support and the other tail side radial conduit, said bridge element being in spaced overlying relationship with respect to the housing for the piston and mounting the housing for the control valve for fluidtight connection with each of said two separate conduits, a source of hydraulic fluid pressure and reservoir therefor, a bridge conduit stop means adapted to selectively stop or allow passage of fluid to and from the housing for the control valve with respect to said two separate fluid conduits, a flexible hydraulic fluid circuit interconnecting the source and reservoir with the control valve housing, for fluidtight connection to said two separate conduits; wherein hydraulic fluid under pressure directed initially from the source to the housing for the control valve, adjacent said control valve, is caused to be fed, therefrom, when said bridge element conduit stop means is in its open position, through either one of said two separate conduits to a side of the head for pressure engagement therewith, in response to substantially identical movement of the control valve thereby to advance or retract the cutting tool with respect to the longitudinal axis of the workpiece in conformity with the template and thereby to force residual hydraulic fluid on the opposite side of a side of the head to the reservoir.

4. A tracer attachment for mounting upon the carriage of a lathe bearing a template and workpiece, said tracer attachment comprising: a stylus adapted to be borne in contiguous relationship with the template, an hydraulically-operated control valve intimately associated with the stylus and responsive to reciprocal movement imparted to the stylus, for reciprocal movement therewith, biasing means urging said control valve towards said stylus, and urging said stylus towards the template, an hydraulically-operated double-acting piston for reciprocal movement in response to said movement of the control valve, composed of a head and quill, said quill having on each side of the head an axial fluid passage and at least two radial fluid passages, being a head side passage and a tail side passage, for ingress to and egress from said axial fluid passage to a side of the head, a housing for the control valve, a housing for the piston, a cutting tool detachably carried at one end of the quill, a bridge mounted upon the quill at the other end thereof and at said one end thereof behind the tool, bridging the housing for the piston and mounting the housing for the control valve, bridge fluid passage means for hydraulic fluid communication between the housing for the control valve and each tail side passage of the quill, a source of hydraulic fluid pressure and reservoir, therefor, hydraulic fluid intake and exhaust means for the housing for the control valve respectively connected to said source and said reservoir, an hydraulic fluid circuit interconnecting both housings, the bridge fluid passage means and each said axial and radial fluid passages to the source and reservoir, selectively engageable control valve retraction means interposed between said control valve and said stylus, when engaged, causing said control valve to work against said biasing means and be moved in a direction away from the stylus; wherein, when said control valve retraction means is unengaged, hydraulic fluid under pressure, directed initially from the source to the hydraulic fluid intake means for the housing for the control valve, adjacent said control valve, is caused to be fed to the housing for the piston via the circuit for pressure engagement with either side of said head in response to substantially identical movement of the control valve thereby to advance or retract the cutting tool with respect to the longitudinal axis of the workpiece in conformity with the template and thereby to force residual hydraulic fluid on the opposite side of said either side of the head to the reservoir.

5. A tracer attachment for mounting upon the carriage of a lathe bearing a template and workpiece, said tracer attachment comprising: a stylus adapted to be borne in contiguous relationship with the template, an hydraulically-operated control valve intimately associated with the stylus and responsive to reciprocal movement imparted to the stylus, for reciprocal movement therewith, biasing means urging said control valve towards said stylus, and urging said stylus towards the template, an hydraulically-operated double-acting piston for reciprocal movement in response to said movement of the control valve, composed of a head and quill, said quill having on each side of the head an axial fluid passage and at least two radial fluid passages, being a head side passage and a tail side passage, for ingress to and egress from said axial fluid passage to a side of the head, a housing for the control valve, a housing for the piston, a cutting tool detachably carried at one end of the quill, a bridge mounted upon the quill at the other end thereof and at said one end thereof behind the tool, bridging the housing for the piston and mounting the housing for the control valve, bridge fluid passage means for hydraulic fluid communication between the housing for the control valve and each tail side passage of the quill, a source of hydraulic fluid pressure and reservoir, therefor, hydraulic fluid intake and exhaust means for the housing for the control valve respectively connected to said source and said reservoir, an hydraulic fluid circuit interconnecting both housings, the bridge fluid passage means and each said axial and radial fluid passages to the source and reservoir, selectively engageable control valve retraction means adapted to cooperate with the control valve to cause the cutting tool to be retracted with respect to the longitudinal axis of the workpiece, when engaged, and comprising a rod movable with respect to the housing for the control valve, said rod carrying a foot element at one end thereof, said foot element projecting intermediate said stylus and control valve and adapted to interrupt said urging of the control valve towards the stylus by said biasing means, and control valve retraction biasing means urging said foot element in a direction to prevent said interruption; wherein, when said rod is moved to cause the foot element to work against said control valve retraction biasing means, and thereby to cause said interruption, hydraulic fluid under pressure directed initially from the source to the hydraulic fluid intake means for the housing for the control valve, is caused to be fed to the housing for the piston via the circuit for pressure engagement with the side of the head nearer the cutting tool in response to substantially identical movement of the control valve by said rod thereby to retract the cutting tool with respect to the longitudinal axis of the workpiece and to force the residual hydraulic fluid on the side of the head farther from the cutting tool to the reservoir.

6. A tracer attachment for mounting upon the carriage of a lathe bearing a template and workpiece, said tracer attachment comprising: a stylus adapted to be borne in contiguous relationship with the template, an hydraulically-operated control valve intimately associated with the stylus and responsive to reciprocal movement imparted to the stylus, for reciprocal movement therewith, biasing means urging said control valve towards said stylus, and urging said stylus towards the template, an hydraulically-operated double-acting piston for reciprocal movement in response to said movement of the control valve, composed of a head and quill, said quill having on each side of the head an axial fluid passage and at least two radial fluid passages, being a head side passage and a tail side passage, for ingress to and egress from said axial fluid passage to a side of the head, a housing for the control valve, a housing for the piston, a cutting tool detachably carried at one end of the quill, a bridge mounted upon the quill at the other end thereof and at said one end thereof behind the tool, bridging the housing for the piston and mounting the housing for the control valve, bridge fluid passage means for hydraulic fluid communication between the housing for the control valve and each tail side passage of the quill, a source of hydraulic fluid pressure and reservoir, therefore, hydraulic fluid intake and exhaust means for the housing for the control valve respectively connected to said source and said reservoir, an hydraulic fluid circuit interconnecting both housings, the bridge fluid passage means and each said axial and radial fluid passages to the source and reservoir, selectively engageable control valve retraction means adapted to cooperate with, and modulate the forward movement of, the control valve, and comprising a rod movable within the housing for the control valve, said rod threadedly carrying a knob at one end thereof beyond said housing and also carrying a foot element at the other end thereof beyond said housing, said foot element being interposed between said stylus and said control valve, and control valve retraction biasing means urging said foot element in a direction toward the stylus and in a direction away from the control valve, said rod, knob, foot element, and control valve retraction biasing means combining with said biasing means to modulate the response of the control valve for forward movement when said knob is loosened with respect to said rod; wherein hydraulic fluid under pressure directed initially from the source to the hydraulic fluid intake means for the housing for the control valve, adjacent said control valve is caused to be fed to the housing for the piston via the circuit for modulated pressure engagement with the side of the head farther from the cutting tool in response to substantially identical modulated movement of the control valve to advance the cutting tool with respect to the longitudinal axis of the workpiece and thereby to force the residual hydraulic fluid on the side of the head nearer the cutting tool to the reservoir.

7. A tracer attachment for mounting upon the carriage of a lathe bearing a template and workpiece, said tracer attachment comprising: a stylus adapted to be borne in contiguous relationship with the template, an hydraulically-operated control valve intimately associated with the stylus and responsive to reciprocal movement imparted to the stylus for reciprocal movement therewith, biasing means urging said control valve towards said stylus, and urging said stylus towards the template, an hydraulically-operated double-acting piston, for reciprocal movement in response to said movement of the control valve, and being composed of a head and quill, said quill having on each side of the head an axial fluid passage and at least two radial fluid passages, being a head side passage and a tail side passage, for ingress to and egress from said axial fluid passage to a side of the head, a cutting tool detachably carried at one end of the quill, a source of hydraulic fluid pressure and reservoir therefor, a bridge, composed of a front and rear upstanding bridge support and a bridge element intermediately fixed to the top of each support, and each support having a fluid conduit therethrough, and the bridge element having at least two separate fluid conduits, one of said two separate conduits adapted to be held in fluidtight relationship with the conduit in the front support, the other of said two separate fluid conduits adapted to be held in fluidtight relationship with the conduit in the rear support, said bridge being mounted upon the quill for fluidtight connection between the conduit in the rear support and a tail side radial passage, and between the conduit in the front support and the other tail side radial passage, a housing for the piston, a housing for the control valve, having a longitudinal bore, an inlet port in fluid communication with said bore, an exhaust port in fluid communication with said bore, said inlet and exhaust ports connected to said source and reservoir respectively, said housing for the control valve being in spaced overlying relationship with respect to said bridge element and said front and rear conduits being connected in fluidtight relationship with said other of said two separate conduit and with said one of said two separate conduits respectively; wherein hydraulic fluid under pressure directed initially from the source to the inlet port, adjacent said control valve, is caused to be fed therefrom through the longitudinal bore, wiping said control valve, to said front or rear conduit to a side of the head for pressure engagement therewith in response to substantially identical movement of the control valve thereby to respectively advance or retract the cutting tool with respect to the longituidnal axis of the workpiece in conformity with the template and thereby to force residual hydraulic fluid on the opposite side of a side of the head to the reservoir.

8. A tracer attachment for mounting upon the carriage of a lathe bearing a template and workpiece, said tracer attachment comprising: a stylus adapted to be borne in contiguous relationship with the template, an hydraulically-operated control valve intimately associated with the stylus and responsive to reciprocal movement imparted to the stylus, for reciprocal movement therewith, said control valve consisting of a center spool intermediate a rear spool and a front spool, said center spool being separated from said front spool by a front annulus of reduced diameter, said center, rear, and front spools being of equal diameter, biasing means urging said control valve towards said stylus, and urging said stylus towards the template, an hydraulically-operated double-acting piston, for reciprocal movement in response to said movement of the control valve, and being composed of a head and quill, said quill having on each side of the head an axial fluid passage and at least two radial fluid passages, being a head side passage and a tail side passage, for ingress to and egress from said axial fluid passage to a side of the head, a cutting tool detachably carried at one end of the quill, a source of hydraulic fluid pressure and reservoir therefor, a bridge, composed of a front and rear upstanding bridge support and a bridge element intermediately fixed to the top of each support, each support having a fluid conduit therethrough, and the bridge element having at least two separate fluid conduits, one of said two separate conduits adapted to be held in fluid-tight relationship with the conduit in the front support, and the other of said two separate fluid conduits adapted to be held in fluidtight relationship with the conduit in the rear support, said bridge being mounted upon the quill for fluidtight connection between the conduit in the rear support and a tail side radial passage, and between the conduit in the front support and the other tail side radial passage, a housing for the piston, a housing for the control valve, having a longitudinal bore slidably engaging said control valve, an inlet port in fluid communication with said bore adjacent said center spool, an exhaust port in fluid communication with said bore adjacent said front and rear spools, a front conduit in fluid communication with said bore adjacent said front annulus, a rear conduit in fluid communication with said bore adjacent said rear annulus, said inlet and exhaust ports connected to said source and reservoir respectively, said housing for the control valve being in spaced overlying relationship with respect to said bridge element and said front and rear conduits being connected in fluidtight relationship with said other of said two separate conduits and with said one of said two separate conduits respectively; wherein hydraulic fluid under pressure directed initially from the source to the inlet port wipes said center spool and is caused to be fed therefrom through the longitudinal bore to said front annulus or rear annulus to a side of the head for pressure engagement therewith in response to substantially identical movement of the control valve thereby to respectively advance or retract the cutting tool with respect to the longitudinal axis of the workpiece in conformity with the template and thereby to force residual hydraulic fluid on the opposite side of a side of the head to the reservoir.

References Cited in the file of this patent

UNITED STATES PATENTS

| | | |
|---|---|---|
| 637,084 | Cassal | Nov. 14, 1899 |
| 1,242,306 | Armstrong | Oct. 9, 1917 |
| 2,727,419 | Evans | Dec. 20, 1955 |
| 2,876,797 | Edman | Mar. 10, 1959 |
| 2,882,777 | Hirvonen | Apr. 21, 1959 |
| 2,949,893 | McCurdy | Aug. 23, 1960 |

OTHER REFERENCES

German printed application H 12995 Ib/49a, Oct. 6, 1955, 82–14.1 (1 sht. dwg.; 2 pages spec.).

UNITED STATES PATENT OFFICE
CERTIFICATE OF CORRECTION

Patent No. 3,145,597                                                August 25, 1964

Clarence W. Tydeman

It is hereby certified that error appears in the above numbered patent requiring correction and that the said Letters Patent should read as corrected below.

Column 12, lines 7 and 8, for "the exhaust end of the spool value will open even in normal position" read -- while said exhaust end remains open slightly even in normal position --; column 13, line 59, for "inlastic" read -- inelastic --; column 15, line 75, for "therefore" read -- therefor --; column 17, line 16, after "said center spool" insert -- being separated from said rear spool by a rear annulus of reduced diameter, and --.

Signed and sealed this 13th day of July 1965.

(SEAL)
Attest:

ERNEST W. SWIDER                                                      EDWARD J. BRENNER
Attesting Officer                                                          Commissioner of Patents